United States Patent
Kuhara (10) Patent No.: US 12,152,526 B2
(45) Date of Patent: Nov. 26, 2024

(54) ABNORMALITY DIAGNOSIS DEVICE OF THERMOSTAT

(71) Applicant: FUJI JUKOGYO KABUSHIKI KAISHA, Tokyo (JP)

(72) Inventor: Masaki Kuhara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 248 days.

(21) Appl. No.: 15/415,491

(22) Filed: Jan. 25, 2017

(65) Prior Publication Data
US 2017/0268410 A1 Sep. 21, 2017

(30) Foreign Application Priority Data
Mar. 16, 2016 (JP) .................. 2016-052747

(51) Int. Cl.
| | |
|---|---|
| *F01P 11/16* | (2006.01) |
| *F01P 7/16* | (2006.01) |
| *G01N 25/72* | (2006.01) |

(52) U.S. Cl.
CPC ............ *F01P 11/16* (2013.01); *F01P 7/16* (2013.01); *G01N 25/72* (2013.01); *F01P 2031/32* (2013.01)

(58) Field of Classification Search
CPC ........... F01P 11/16; F01P 7/16; F01P 2031/32
USPC ..................................................... 123/41.15
See application file for complete search history.

(56) References Cited

U.S. PATENT DOCUMENTS

| | | | | |
|---|---|---|---|---|
| 6,665,608 | B2* | 12/2003 | Wakahara | F01P 11/16 123/41.15 |
| 2002/0111734 | A1* | 8/2002 | Wakahara | F02D 41/123 701/114 |
| 2009/0265086 | A1* | 10/2009 | Iihoshi | F02D 41/064 701/113 |
| 2012/0318214 | A1* | 12/2012 | Iwai | F01P 11/16 123/41.15 |
| 2018/0112585 | A1* | 4/2018 | Kaneta | F01P 3/20 |

FOREIGN PATENT DOCUMENTS

JP 2002-317685 A 10/2002

* cited by examiner

*Primary Examiner* — Lindsay M Low
*Assistant Examiner* — Omar Morales
(74) *Attorney, Agent, or Firm* — CHIP LAW GROUP (57) ABSTRACT

An abnormality diagnosis device of a thermostat includes: a temperature detection module that detects a temperature of cooling water on the basis of a sensor signal of a cooling water temperature sensor; an abnormality determination module that detects an abnormality of the thermostat, when the temperature of the cooling water reaches a first reference temperature and thereafter becomes lower than an abnormality determination reference temperature that is lower than the first reference temperature; and a cooling water temperature adjustment module that executes a control for preventing temperature decrease of the cooling water, when the temperature of the cooling water reaches the first reference temperature and thereafter becomes lower than a second reference temperature that is lower than the first reference temperature and is higher than the abnormality determination reference temperature.

20 Claims, 6 Drawing Sheets

ABNORMALITY DIAGNOSIS DEVICE OF THERMOSTAT

CROSS-REFERENCE TO RELATED APPLICATIONS

The present application claims priority from Japanese Patent Application No. 2016-052747 filed on Mar. 16, 2016, the entire contents of which are hereby incorporated by reference.

BACKGROUND

1. Technical Field

The present invention relates to an abnormality diagnosis device of a thermostat.

2. Related Art

An engine (internal-combustion engine) that is mounted on a vehicle or the like is cooled by circulating cooling water in a cooling water passage that is provided in the engine. The cooling water is cooled by releasing its heat by a heat release device which is represented by a radiator, and is fed with pressure by a cooling water pump, and circulates a cooling water circulation passage that includes the cooling water passage that is provided in the engine.

Here, if the temperature of a combustion chamber is low, the combustion efficiency of the engine decreases, and thus the cooling system is configured to circulate the cooling water so as not to pass the radiator until the engine temperature rises, so that the engine temperature promptly rises. Specifically, in addition to a first circulation passage that returns the cooling water that has passed the cooling water passage provided in the engine to an upstream side of a cooling pump via the radiator, a second circulation passage that returns the cooling water to the upstream side of the cooling pump by bypassing the radiator is provided, and a thermostat that opens and closes the first circulation passage depending on the temperature of the cooling water is provided in the first circulation passage.

While the temperature of the cooling water is low, the thermostat closes the first circulation passage. Thereby, the cooling water is returned to the upstream side of the cooling water pump without passing through the radiator. Also, after the temperature of the cooling water rises, the thermostat opens the first circulation passage. Thereby, the cooling water passes through the radiator and is returned to the upstream side of the cooling water pump, so that the cooling water is cooled.

A cooling water temperature estimation device of the engine which properly performs abnormality determination of the thermostat is disclosed in Japanese Unexamined Patent Application Publication No. 2002-317685. This cooling water temperature estimation device estimates the cooling water temperature on the basis of engine operation parameters, during the engine operation, and determines presence or absence of abnormality of the thermostat by comparing the estimated cooling water temperature with an actual cooling water temperature detected by a cooling water temperature sensor. Also, this cooling water temperature estimation device prevents a difference between the estimated value of the cooling water temperature and the actual cooling water temperature from becoming excessive, by estimating increase of the cooling water temperature during executing fuel cut, in consideration of the fact that the cooling water temperature rises even during executing fuel cut.

Here, when an abnormality occurs in the thermostat, the cooling water temperature sometimes decreases largely again, when the engine is warmed up after the start of the engine. The abnormality of the thermostat associated with the decrease of the cooling water temperature needs to be detected properly. For example, a vehicle performs various self-diagnoses in which the cooling water temperature is used as one condition, and when the cooling water temperature decreases largely, execution of other self-diagnoses needs to be stopped.

To solve this, it is considered effective to monitor the cooling water temperature and detect the abnormality of the thermostat when the cooling water temperature exceeds the water temperature at the time of warm-up completion and thereafter again decreases down to a reference temperature or lower which enables determination of the abnormality of the thermostat. However, it is envisaged that the cooling water temperature decreases largely after the engine has warmed up, even though the thermostat is normal, depending on the traveling state of the vehicle. For example, the cooling water temperature decreases largely, when the vehicle continues traveling steadily for a long time, such as when the vehicle travels a long downward slope. Even in this case, it is necessary that the abnormality of the thermostat is not detected.

SUMMARY OF THE INVENTION

It is desirable to provide a new and improved abnormality diagnosis device of a thermostat that can properly execute abnormality determination of the thermostat, by using a cooling water temperature that is detected by a cooling water temperature sensor.

An aspect of the present invention provides an abnormality diagnosis device of a thermostat that opens and closes a cooling water passage, according to a temperature of cooling water of an engine, and switches between availability and unavailability of flow of the cooling water to a heat release device, including: a temperature detection module that detects the temperature of the cooling water on the basis of a sensor signal of a cooling water temperature sensor; an abnormality determination module that detects an abnormality of the thermostat, when the temperature of the cooling water reaches a first reference temperature and thereafter becomes lower than an abnormality determination reference temperature that is lower than the first reference temperature; and a cooling water temperature adjustment module that executes a control for preventing temperature decrease of the cooling water, when the temperature of the cooling water reaches the first reference temperature and thereafter becomes lower than a second reference temperature that is lower than the first reference temperature and is higher than the abnormality determination reference temperature.

The cooling water temperature adjustment module may execute one or both of a control for reducing heat release of the cooling water and a control for increasing heat generation of the engine.

When the temperature of the cooling water is lower than the second reference temperature in a fuel cut control state, the cooling water temperature adjustment module may halt the fuel cut control.

When the temperature of the cooling water is lower than the second reference temperature, and a traveling mode of a vehicle is an electric vehicle mode, the cooling water temperature adjustment module may start driving of the engine.

The cooling water temperature adjustment module may execute small amount fuel injection.

The cooling water temperature adjustment module may decrease output of a heater device that utilizes a heat quantity of the cooling water.

The cooling water temperature adjustment module may decrease a flow rate of the cooling water that passes through the engine.

DETAILED DESCRIPTION

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

<1. Overall Configuration Example of Engine Cooling System>

Figure 1:
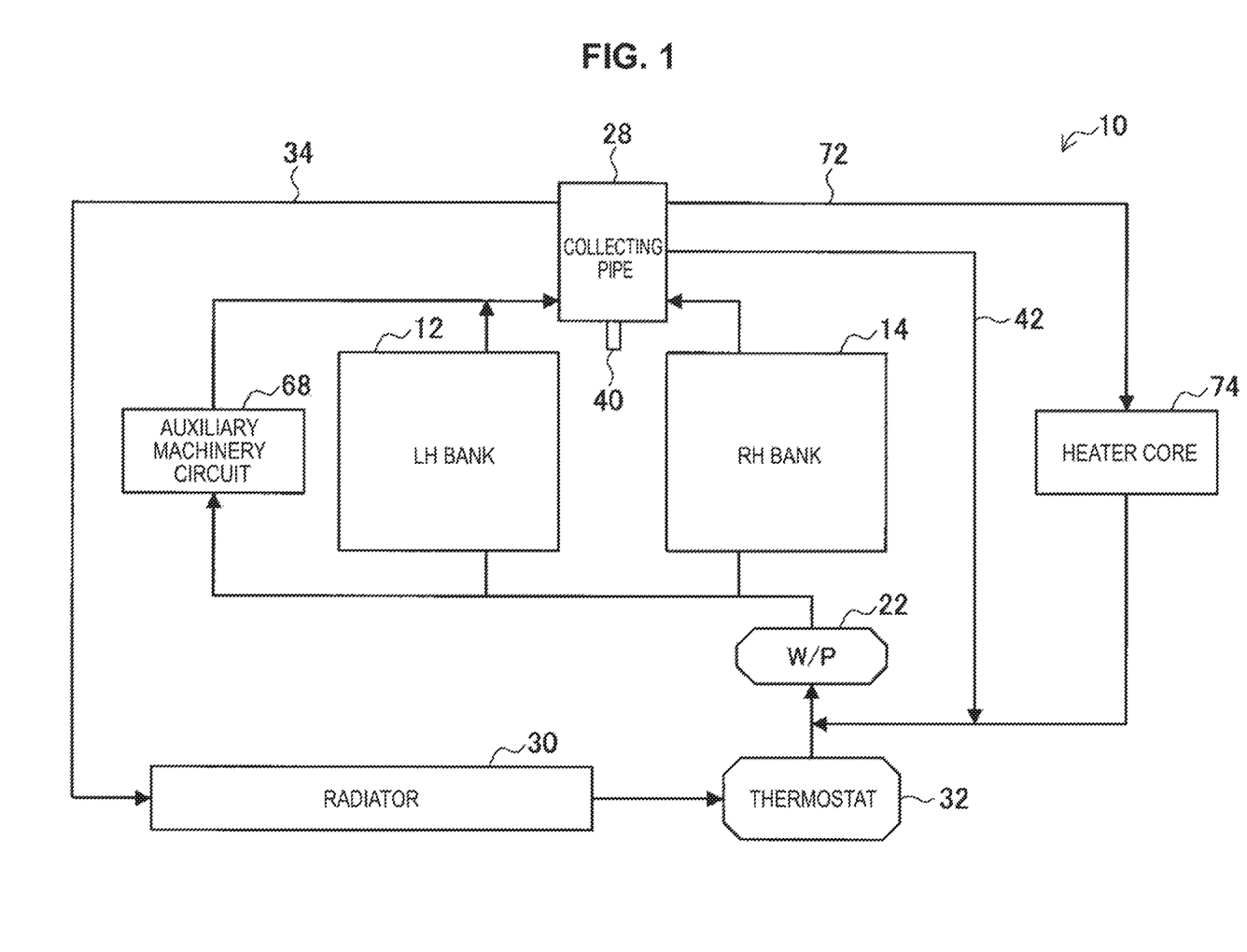
FIG. 1 is a schematic diagram illustrating a schematic configuration of an engine cooling system according to an implementation of the present invention.

First, an example of an overall configuration of an engine cooling system 10 that can employ an abnormality diagnosis device of a thermostat according to an implementation of the present invention will be described. FIG. 1 is a schematic diagram illustrating the overall configuration of the engine cooling system 10 schematically. This engine cooling system 10 is an example that is applied to a horizontally opposed 4-cylinder gasoline engine. The engine may be a V or straight engine of the past, and the number of cylinders is not limited to 4 cylinders.

A left bank 12 (denoted by "LH bank" in FIG. 1.) of the engine and a right bank 14 (denoted by "RH the bank" in FIG. 1.) are each provided with a water jacket (a cooling water passage) (not depicted). The cooling system 10 of the engine circulates cooling water while distributing the cooling water to the water jackets of the left bank 12 and the right bank 14 of the engine, in order to cool the engine. The cooling system 10 of the engine includes a cooling water pump (denoted by "W/P", in FIG. 1.) 22, a radiator 30, a thermostat 32, and a heater core 74.

For example, an electric pump driven by a motor or the like is used as the cooling water pump 22. The cooling water pump 22 may be a gear pump that is linked to a crank shaft of the engine via a gear.

While the cooling water pump 22 is driven. the cooling water that is fed with pressure by the cooling water pump 22 is distributed to the left bank 12 and the right bank 14, and flows through the water jackets provided in the left bank 12 and the right bank 14. The cooling water that passes through the water jackets provided in the left bank 12 and the right bank 14 flows into the collecting pipe 28. Also, a part of the cooling water that is fed with pressure by the cooling water pump 22 flows through an auxiliary machinery circuit 68, and flows into a collecting pipe 28. The auxiliary machinery circuit 68 is a cooling water passage that is provided in an exhaust gas recirculation (EGR) device for example, and is provided to cool a heat generation unit other than the engine.

A first circulation passage 34, a second circulation passage 42, and a third circulation passage 72 are coupled to the collecting pipe 28. The first circulation passage 34, the second circulation passage 42, and the third circulation passage 72 are each in communication with an upstream side of the cooling water pump 22. The cooling water that passes through the engine and the auxiliary machinery circuit 68 and meets at the collecting pipe 28 is returned to the upstream side of the cooling water pump 22 via the first circulation passage 34, the second circulation passage 42, and the third circulation passage 72.

The radiator 30 provided in the first circulation passage 34 is an example of a heat release device that decreases the temperature of the cooling water by releasing heat of the cooling water. The cooling water that passes through the radiator 30 is returned to the upstream side of the cooling water pump 22 via the thermostat 32.

The thermostat 32 is provided to open and close an outlet of the first circulation passage 34. The thermostat 32 shuts off the first circulation passage 34 when the cooling water temperature is lower than a predetermined threshold value, and prohibits circulation of the cooling water via the radiator 30. On the other hand, the thermostat 32 opens the first circulation passage 34 when the cooling water temperature is equal to or higher than the predetermined threshold value, and enables the circulation of the cooling water via the radiator 30. The flow channel of the cooling water that circulates to the upstream side of the cooling water pump 22 via the second circulation passage 42 and the third circulation passage 72 can be opened, regardless of an open-close state of the thermostat 32.

For example, the thermostat 32 may be a thermostat that includes a wax element that opens and closes a thermo valve by changing the volume of wax depending on temperature. The thermostat 32 may be provided with a bottom bypass valve. When the cooling water temperature is lower than a predetermined threshold value, the thermostat 32 shuts off the first circulation passage 34, and opens the second circulation passage 42 side. Thus, when the cooling water temperature is lower than a predetermined threshold value, the cooling water that has passed through the engine and the auxiliary machinery circuit 68 circulates via the second circulation passage 42, without passing through the radiator 30. Thereby, when the cooling water temperature is low, the cooling water temperature is increased immediately, in order to promptly warm up the engine. The threshold value at which the thermostat 32 opens the first circulation passage 34 can be set to 75° C., for example. Note that the thermostat 32 may be provided in the first circulation passage 34 of the upstream side from the radiator 30.

The heater core 74 provided in the third circulation passage 72 is a device that is used to heat a vehicle interior by utilizing a heat quantity of the cooling water. For example, it may be such that a heater cock (not depicted) is provided in the third circulation passage 72, and the heater cock is opened in response to a heating request, and the cooling water flows into the heater core 74. The cooling water that passes through the heater core 74 is cooled by heat exchange in the heater core 74, and is returned to the upstream side of the cooling water pump 22 via the thermostat 32.

Also, a cooling water temperature sensor 40 is provided in the collecting pipe 28. The cooling water temperature sensor 40 generates a sensor signal according to the cooling water temperature at an installation position, and transmits the sensor signal to a control device (not depicted). The installation position of the cooling water temperature sensor 40 is not limited to the collecting pipe 28. The installation position of the cooling water temperature sensor 40 may be a position at which the temperature state of the engine is likely to be reflected, and for example may be provided at the outlet part of the water jacket of the left bank 12 or the right bank 14.

<2. Abnormality Diagnosis Device of Thermostat>

Figure 2:
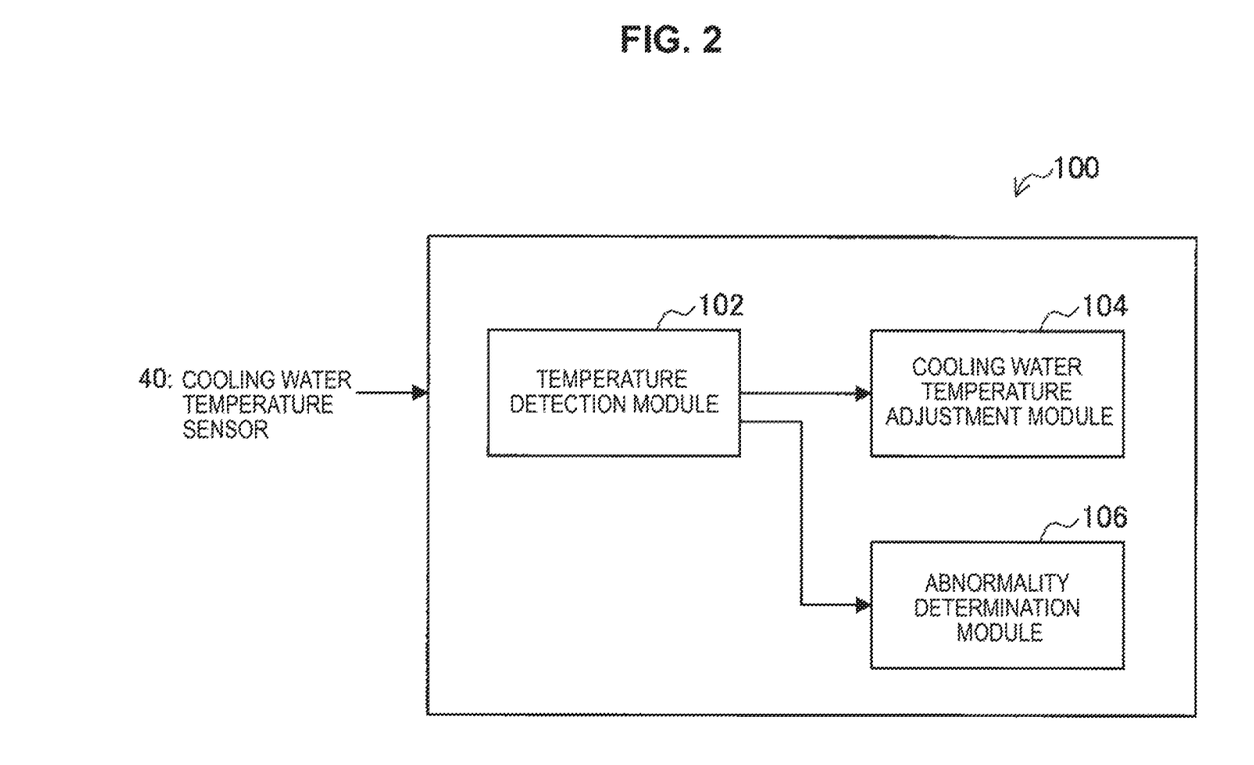
FIG. 2 is a block diagram illustrating an exemplary configuration of an abnormality diagnosis device of a thermostat according to the same implementation.

Next, an exemplary configuration of the abnormality diagnosis device of the thermostat according to the present implementation will be described. FIG. 2 is a block diagram illustrating the function and configuration of the abnormality diagnosis device 100 of the thermostat. This abnormality diagnosis device 100 is configured with a publicly known microcomputer, and includes a temperature detection module 102, a cooling water temperature adjustment module 104, and an abnormality determination module 106. Each of these modules may be implemented by executing a software program by the microcomputer. Also, the abnormality diagnosis device 100 includes a storage element (not depicted), such as a random access memory (RAM) and a read only memory (ROM). The abnormality diagnosis device 100 can acquire a sensor signal of the cooling water temperature sensor 40, and information of a fuel injection amount of an engine and an engine speed.

(Temperature Detection Module)

The temperature detection module 102 detects the cooling water temperature Tw on the basis of the sensor signal of the cooling water temperature sensor 40. The detected cooling water temperature Tw is stored in a storage unit (not depicted).

(Abnormality Determination Module)

The abnormality determination module 106 determines presence or absence of an abnormality of the thermostat 32, on the basis of the cooling water temperature Tw that is detected by the cooling water temperature sensor 40. The abnormality determination module 106 detects an abnormality of the thermostat 32 when the cooling water temperature Tw reaches a first reference temperature Tw1 after the start of the engine, and thereafter has become lower than an abnormality determination reference temperature Tw_thre that is lower than the first reference temperature Tw1.

If the thermostat 32 is normal, after the engine has been warmed up so as to increase the cooling water temperature Tw once, the cooling water temperature Tw does not fall significantly as long as the operation of the engine continues. In contrast, when the cooling water temperature Tw reaches the first reference temperature Tw1 at which it is estimated that the engine has been warmed up and thereafter becomes lower than the abnormality determination reference temperature Tw_thre, the thermostat 32 is considered to be in a stuck open state in which the thermostat 32 is unable to be closed even after the cooling water temperature Tw has fallen. Thus, when this state is detected, the abnormality determination module 106 detects the abnormality of the thermostat 32. The abnormality determination module 106 actuates a warning unit, such as a warning display or a warning sound, when detecting the abnormality of the thermostat 32, and informs a driver or the like of the abnormality of the thermostat 32. Thereby, the engine is prevented from being operated continuously in a low combustion efficiency state.

Figure 3:
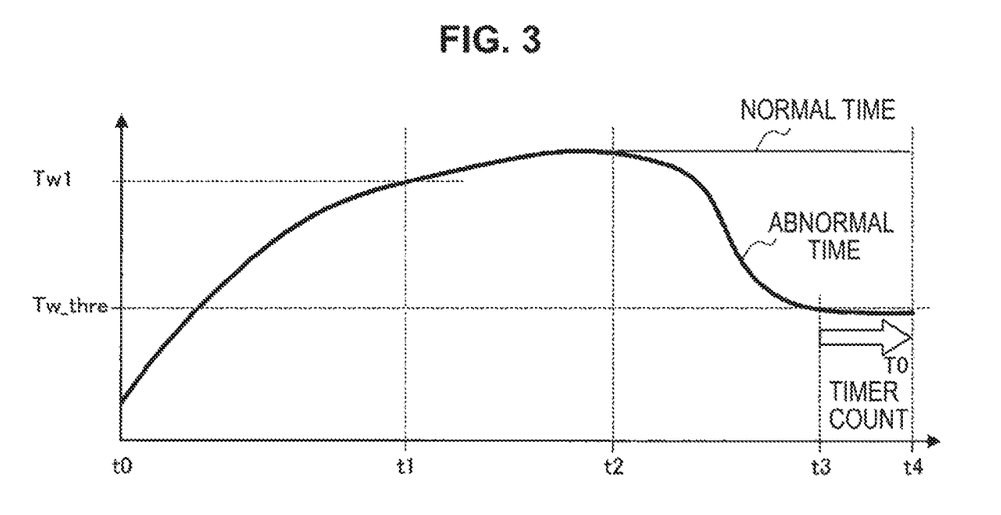
FIG. 3 is an explanatory diagram illustrating an overview of abnormality diagnosis of a thermostat according to the same implementation.

FIG. 3 is an explanatory diagram illustrating a basic way of thinking of the abnormality diagnosis of the thermostat 32 by the abnormality determination module 106. FIG. 3 illustrates transition of the cooling water temperature Tw that is detected by the cooling water temperature sensor 40. After a time point t0 at which the engine is started, the cooling water is heated by combustion heat, and the cooling water temperature Tw gradually rises. At the time of the start of the engine, the first circulation passage 34 is shut off by the thermostat 32, and the cooling water circulates without passing through the radiator 30, and thus the engine and the cooling water temperature Tw are promptly warmed up, and the cooling water temperature Tw reaches the first reference temperature Tw1 at a time point t1.

When the thermostat 32 is normal, it is rare that the cooling water temperature Tw reaches the first reference temperature Tw1 once and thereafter decreases significantly. On the other hand, when the thermostat 32 is abnormal, it can be conceived that the cooling water temperature Tw reaches the first reference temperature Tw1 once and thereafter becomes lower than the abnormality determination reference temperature Tw_thre. This can occur when the thermostat 32 is abnormal, and the first circulation passage 34 is not shut off even when the cooling water temperature Tw decreases, and the cooling water circulates and passes through the radiator 30. In the example illustrated in FIG. 3, the abnormality determination module 106 counts the time since the cooling water temperature Tw has become lower than the abnormality determination reference temperature Tw_thre, and when the counter value reaches a preset reference time T0, determines that an abnormality has occurred in the thermostat 32. The reference time T0 may be set to 1 to 5 seconds, for example. With this reference time T0, the abnormality of the thermostat 32 can prevented from being detected when the cooling water temperature Tw temporarily becomes lower than the abnormality determination reference temperature Tw_thre.

The first reference temperature Tw1 is set to a temperature that enables determination of completion of warming up the engine, for example. For example, the first reference temperature Tw1 may be set within a range of 80 to 90° C. Also, the abnormality determination reference temperature Tw_thre is set in consideration of the threshold value of valve opening of the thermostat 32. For example, the abnormality determination reference temperature Tw_thre may be set to a temperature that is unable to be reduced to in a normal situation, because the first circulation passage 34 is shut off by the thermostat 32 after warming up the engine in order to prevent decrease of the cooling water temperature Tw, when the thermostat 32 is normal. Thereby, at the time of the abnormality of the thermostat 32, the engine is driven in a fail-safe mode for example, in order to prevent the engine from being operated as usual in a low combustion efficiency state.

Also, in the vehicle, when another diagnosis is to be executed under a condition that the cooling water temperature Tw is equal to or higher than a predetermined temperature, the predetermined temperature may be set as the abnormality determination reference temperature Tw_thre. The abnormality determination reference temperature Tw_thre corresponds to a temperature condition of another diagnosis, and thereby the other diagnosis can be stopped at the time of the abnormality of the thermostat 32, in order to prevent erroneous determination of the other diagnosis. When the other diagnosis exists in plurality, the highest temperature of the temperatures of the diagnosis condition may be set as the abnormality determination reference temperature Tw_thre. For example, the abnormality determination reference temperature Tw_thre may be set to 60° C.

(Cooling Water Temperature Adjustment Module)

The cooling water temperature adjustment module 104 executes a control for preventing the decrease of the cooling water temperature Tw, when the cooling water temperature becomes lower than the second reference temperature Tw2, after the cooling water temperature Tw reaches the first reference temperature Tw1, after the start of the engine. The second reference temperature Tw2 is lower than the first reference temperature Tw1, and is set to a temperature that is higher than the abnormality determination reference temperature Tw_thre. Even when the thermostat 32 is normal, after the engine has been warmed up, and the cooling water temperature Tw reaches the first reference temperature Tw1, the cooling water temperature Tw can decrease in some cases, depending on a traveling state and a surrounding environment condition of the vehicle. For example, if the fuel injection amount is zero continuously for a long time, the cooling water temperature Tw can be lower than the abnormality determination reference temperature Tw_thre, even when the thermostat 32 is closed so that the cooling water circulates without passing through the radiator 30. In particular, when a heating device outputs a large amount of heat in the vehicle interior in the cold area, and high speed traveling continues for a long time with the fuel injection amount at zero, the cooling water temperature Tw tends to become lower than the abnormality determination reference temperature Tw_thre.

Thus, the cooling water temperature adjustment module 104 executes a control for preventing the decrease of the cooling water temperature Tw before the cooling water temperature Tw decreases to the abnormality determination reference temperature Tw_thre, so that an abnormality of the thermostat 32 is not detected erroneously when the thermostat 32 does not have the abnormality. The second reference temperature Tw2 for starting the control for preventing the decrease of the cooling water temperature Tw can be set to a temperature that is higher by a predetermined margin temperature than the abnormality determination reference temperature Tw_thre, for example. Thereby, even when a temporal difference is generated until the cooling water temperature Tw starts rising after the cooling water temperature Tw becomes lower than the second reference temperature Tw2, the cooling water temperature Tw is prevented from becoming lower than the abnormality determination threshold value Tw_thre. For example, when the abnormality determination reference temperature Tw_thre is 60° C., the second reference temperature Tw2 may be set to 70° C.

The decrease of the cooling water temperature Tw at a normal time of the thermostat 32 can occur in a state in which combustion does not occur in a combustion chamber of the engine, such as a fuel cut control state or a state with a fuel injection amount at zero as represented by an electric vehicle (EV) mode state in a hybrid vehicle. The fuel cut control state can be detected on the basis of information of the fuel injection amount, for example. Also, the EV mode state can be detected by acquiring information of a hybrid control mode, for example.

Figure 4:
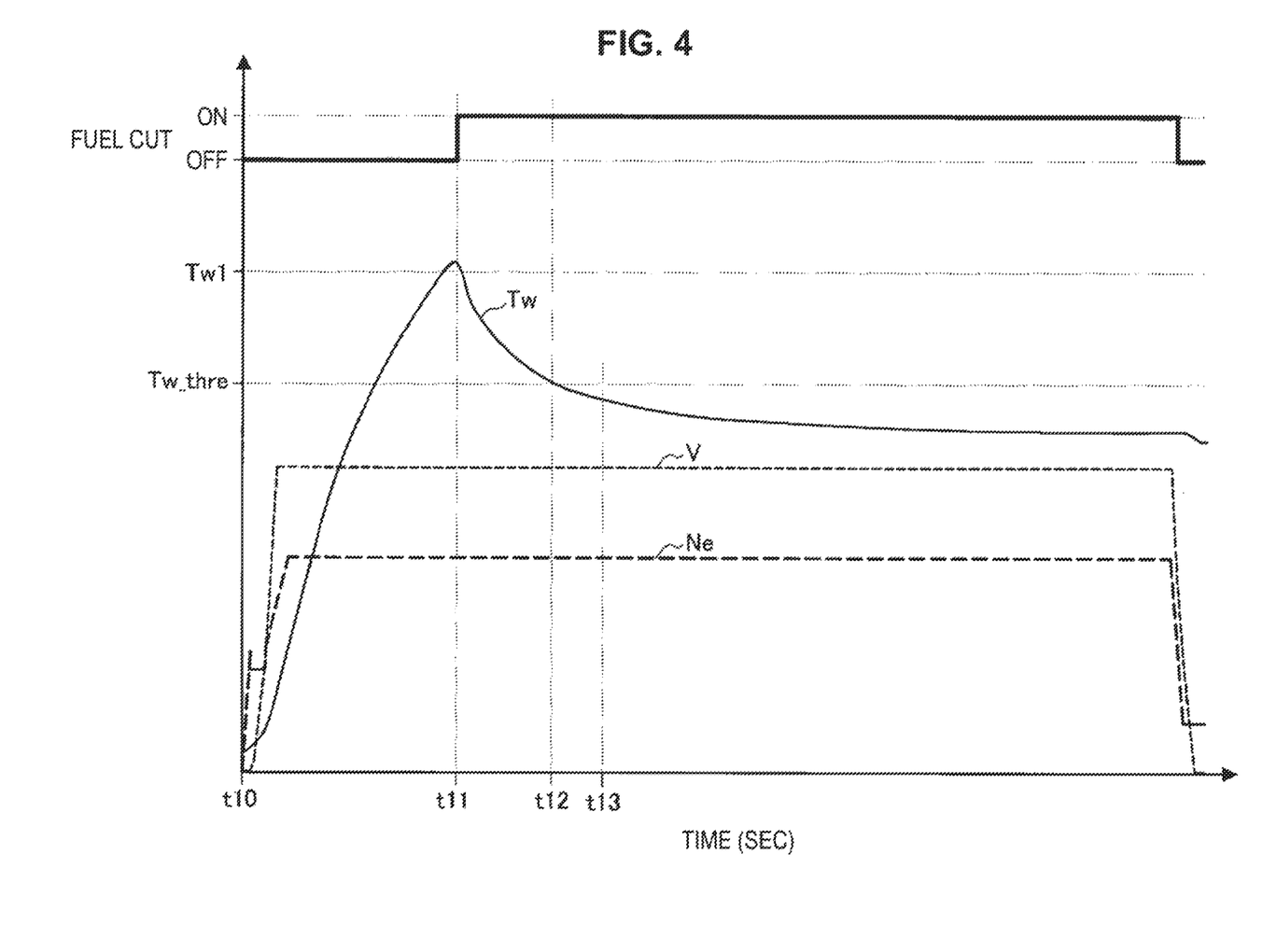
FIG. 4 is an explanatory diagram illustrating an abnormality diagnosis method of a thermostat according to a reference example.
Figure 5:
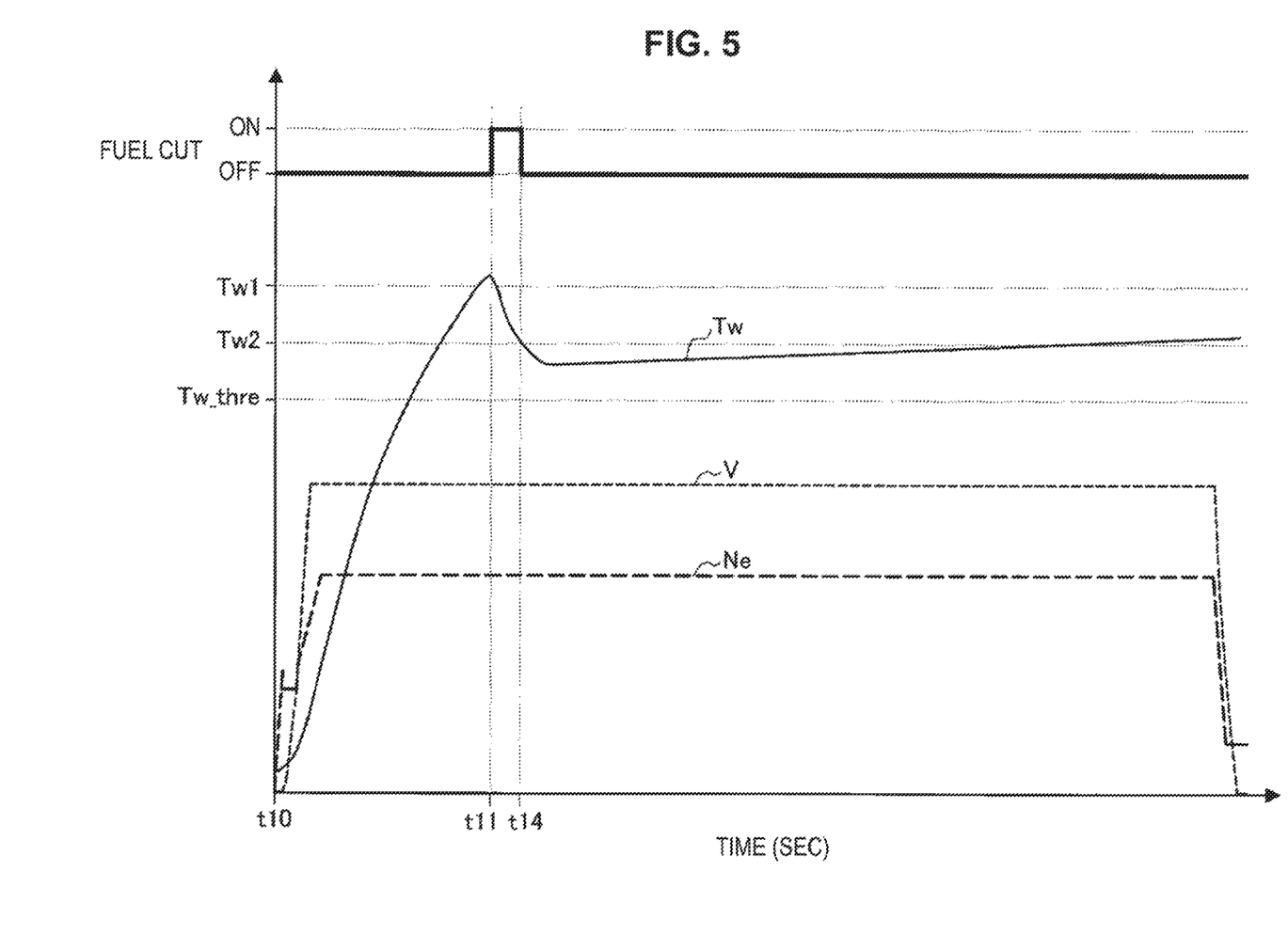
FIG. 5 is an explanatory diagram illustrating an abnormality diagnosis method of a thermostat according to the same implementation.

FIGS. 4 and 5 are time charts illustrating transitions of the cooling water temperature Tw when the vehicle travels a long downward slope in a fuel cut state, and FIG. 4 illustrates a reference example that does not execute a control for preventing the decrease of the cooling water temperature Tw, and FIG. 5 illustrates an example that executes the control for preventing the decrease of the cooling water temperature Tw. In the example of FIG. 5, a control for halting a fuel cut control is executed as the control for preventing the decrease of the cooling water temperature Tw.

In each of FIGS. 4 and 5, the engine is started at a time point t10, and thereafter the cooling water is heated by combustion heat, and the cooling water temperature Tw gradually rises and exceeds the first reference temperature Tw1. During this, the thermostat 32 opens the first circulation passage 34 at a predetermined time, and the cooling water starts circulating through the radiator 30. Then, the vehicle starts traveling on a long downward slope, and the driver releases an accelerator pedal at a time point t11, and thereby the fuel cut control is switched from an off state to an on state.

When the control for preventing the decrease of the cooling water temperature Tw is not executed, the cooling water is not heated by combustion heat, as illustrated in FIG. 4, and in addition the cooling water passes through the engine at a low temperature, and thereby the cooling water is cooled further. During this, the first circulation passage 34 is shut off by the thermostat 32, and the cooling water circulates without passing through the radiator 30, but the cooling water temperature Tw can be lower than the abnormality determination reference temperature Tw_thre, due to the influence of decreasing of the engine temperature. At a time point t12, the cooling water temperature Tw is lower than the abnormality determination reference temperature Tw_thre, and at a time point t13 at which a predetermined reference time T0 has elapsed from the time point t12, the abnormality determination module 106 detects the abnormality of the thermostat 32, regardless of a normal state of the thermostat 32.

On the other hand, when the control for preventing the decrease of the cooling water temperature Tw is executed, the cooling water temperature Tw decreases once as illustrated in FIG. 5, but when the cooling water temperature Tw becomes lower than a second reference threshold value Tw2 at a time point t14, the fuel cut control is halted by the cooling water temperature adjustment module 104 (on→off). Thereby, generation of combustion heat is restarted in the engine, and the cooling water temperature Tw changes to a rising state. Thus, the cooling water temperature Tw does not become lower than the abnormality determination reference temperature Tw_thre, and the abnormality determination module 106 does not detect the abnormality of the thermostat 32.

If the thermostat 32 is abnormal, the cooling water circulates through the radiator 30 even when the control for preventing the decrease of the cooling water temperature Tw is executed, and thus the cooling water temperature Tw can gradually decrease and become lower than the abnormality determination reference temperature Tw_thre. Thus, the cooling water temperature adjustment module 104 executes the control for preventing the decrease of the cooling water temperature Tw, to a degree that the cooling water temperature Tw can decrease when the thermostat 32 is abnormal and the cooling water circulates through the radiator 30.

The control for preventing the decrease of the cooling water temperature Tw may be one or both of a control for increasing the heat generation amount of the engine and a control for decreasing the heat release amount of the cooling water. That is, the control for preventing the decrease of the cooling water temperature Tw can be executed, by increasing the heat generation amount of the engine to increase the heat quantity that is transmitted to the cooling water temperature Tw, or by decreasing the heat release amount of the cooling water.

The control for increasing the heat generation amount of the engine may be a control for halting the fuel cut control when the engine is in a fuel cut control state, for example. In this case, the fuel injection is switched to small amount fuel injection (small fuel injection) in which the output engine torque is reduced as small as possible, even though the combustion heat is generated. Thereby, a feeling of strangeness given to a driver is reduced, and the decrease of the fuel efficiency can be prevented.

Also, the control for increasing the heat generation amount of the engine may be a control for starting driving of the engine when the vehicle travels in an EV mode. In this case, a request torque of the vehicle is shared appropriately by the engine and the drive motor, in order to drive the engine. In particular, the decrease of the fuel efficiency can be prevented by small amount fuel injection (small fuel injection) to a degree that the output torque of the engine is reduced as small as possible.

Also, the control for decreasing the heat release amount of the cooling water may be a control that shuts off the circulation of the cooling water in the engine cooling system 10 or decreases the circulation amount. For example, when the collecting pipe 28 is provided with an electronically controlled flow channel switching valve that switches a circulation passage used when the cooling water that has passed through the engine and the auxiliary machinery circuit 68 is returned to the upstream side of the cooling water pump 22, between the first circulation passage 34, the second circulation passage 42, and the third circulation passage 72, the circulation of the cooling water may be shut off, or the circulation amount may be reduced, by using the flow channel switching valve. Alternatively, an electronically controlled shutoff valve may be provided at a position such as the upstream side or the downstream side of the cooling water pump 22, in order to shut off the circulation of the cooling water. Thereby, the amount of the cooling water that circulates the engine that does not generate the combustion heat and is at a comparatively low temperature becomes small, and the decrease of the cooling water temperature Tw can be prevented.

Also, the control for decreasing the heat release amount of the cooling water may be a control for decreasing the output of the heating device of the vehicle interior. The heat release amount that is lost by the heat exchange from the cooling water that passes through the heater core 74 is reduced by decreasing the output of the heating device, and the decrease of the cooling water temperature Tw can be prevented. Note that, in a cold area, the comfort of the passenger in the vehicle interior can be impaired by decreasing the output of the heating device, and thus the set temperature may be decreased within a range of approximately 1 to 3° C. when the output of the heating device is decreased.

In this way, the cooling water temperature adjustment module 104 prevents the decrease of the cooling water temperature Tw, when the cooling water temperature Tw becomes lower than the second reference temperature Tw2, and thereby the cooling water temperature Tw can be prevented from becoming lower than the abnormality determination reference temperature Tw_thre and being determined as an abnormality even though the thermostat 32 is normal. Thereby, the reliability of abnormality diagnosis of the thermostat 32 can be improved.

<3. Abnormality Diagnosis Method of Thermostat>

Down to here, the exemplary configuration of the abnormality diagnosis device 100 of the thermostat 32 according to the present implementation has been described. In the following, an example of an abnormality diagnosis method of the thermostat 32 executed by the abnormality diagnosis device 100 will be described.

Figure 6:
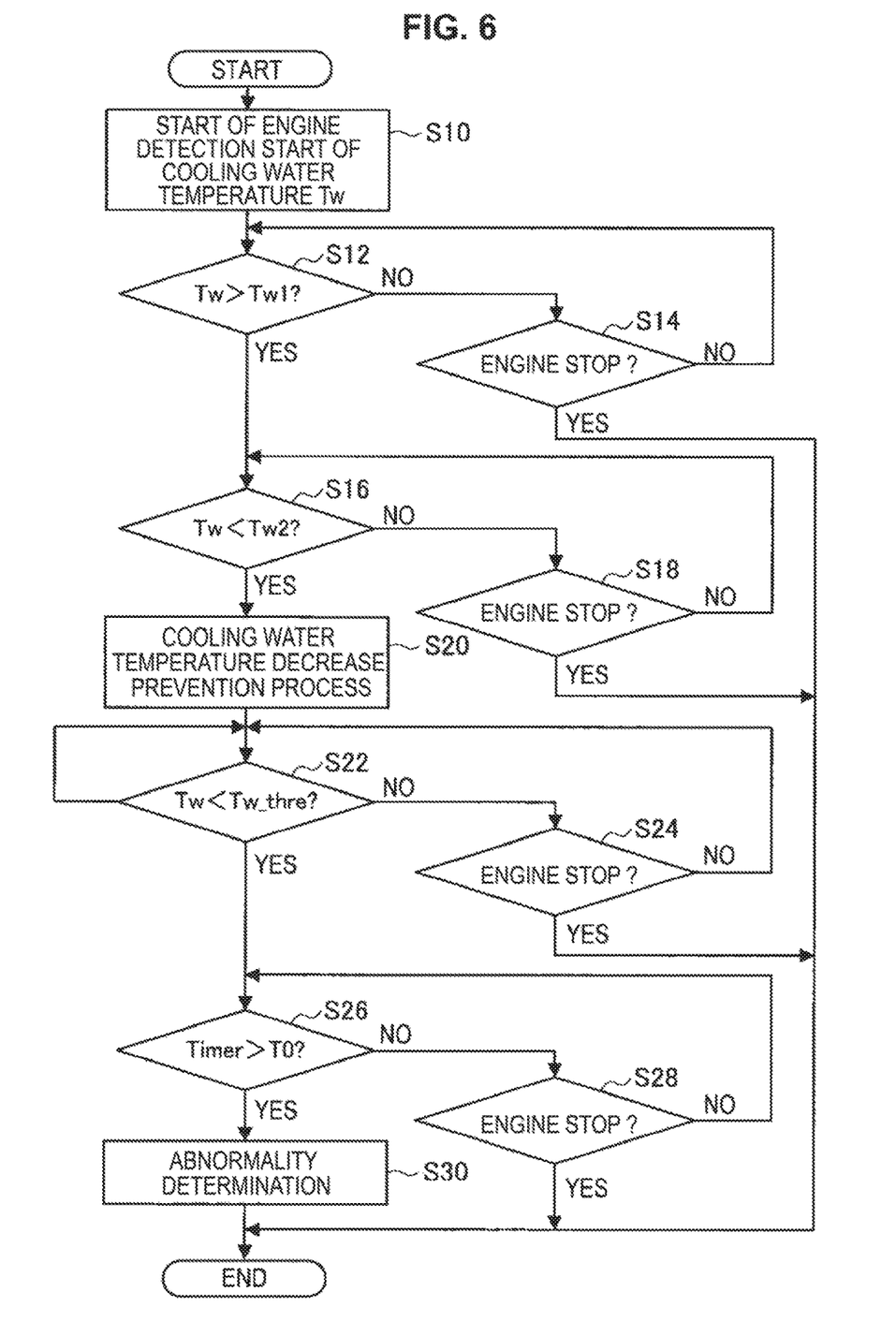
FIG. 6 is a flowchart illustrating an abnormality diagnosis method of a thermostat according to the same implementation.

FIG. 6 illustrates a flowchart of the abnormality diagnosis method of the thermostat 32. In step S10, when the abnormality diagnosis device 100 detects the start of the engine, the temperature detection module 102 acquires a sensor signal of the cooling water temperature sensor 40 at a predetermined process cycle, and detects the cooling water temperature Tw. Thereafter, in step S12, the abnormality determination module 106 of the abnormality diagnosis device 100 determines whether the cooling water temperature Tw exceeds the first reference temperature Tw1.

If the cooling water temperature Tw is equal to or lower than the first reference temperature Tw1 (S12: No), the abnormality determination module 106 determines whether a key switch of the vehicle has been turned off, in step S14. If the key switch of the vehicle is turned off (S14: Yes), the abnormality diagnosis device 100 ends the current routine. On the other hand, if the key switch of the vehicle is not turned off (S14: No), the abnormality determination module 106 repeats steps S12 and S14, until the cooling water temperature Tw exceeds the first reference temperature Tw1.

If the cooling water temperature Tw exceeds the first reference temperature Tw1 (S12: Yes), the cooling water temperature adjustment module 104 of the abnormality diagnosis device 100 determines whether the cooling water temperature Tw has become lower than the second reference temperature Tw2, in step S16. If the cooling water temperature Tw is equal to or higher than the second reference temperature Tw2 (S16: No), the cooling water temperature adjustment module 104 determines whether the key switch of the vehicle has been turned off, in step S18. The first step S16 after step S12 determines No. If the key switch of the vehicle is turned off (S18: Yes), the abnormality diagnosis device 100 ends the current routine. On the other hand, if the key switch of the vehicle is not turned off (S18: No), the cooling water temperature adjustment module 104 repeats steps S16 and S18, as long as the cooling water temperature Tw does not become lower than the second reference temperature Tw.

If the cooling water temperature Tw becomes lower than the second reference temperature Tw2 (S16: Yes), the cooling water temperature adjustment module 104 executes the control for preventing the decrease of the cooling water temperature Tw, in step S20. The cooling water temperature adjustment module 104 increases the heat generation of the engine, by halting the fuel cut control or halting EV mode traveling to start the engine, for example. Also, the cooling water temperature adjustment module 104 may forcibly stop the circulation of the cooling water, or decrease the circulation amount, or decrease the output of the heating device of the vehicle interior, for example. Thereby, if there is no abnormality in the thermostat 32, the decrease of the cooling water temperature Tw stops.

Thereafter, in step S22, the abnormality determination module 106 determines whether the cooling water temperature Tw has become lower than the abnormality determination reference temperature Tw_thre. If the cooling water temperature Tw is equal to or higher than the abnormality determination reference temperature Tw_thre (S22: No), the abnormality determination module 106 determines whether the key switch of the vehicle has been turned off, in step S24. If the key switch of the vehicle is turned off (S24: Yes), the abnormality diagnosis device 100 ends the current routine. On the other hand, if the key switch of the vehicle is not turned off (S24: No), the abnormality determination module 106 repeats steps S22 and S24, as long as the cooling water temperature Tw does not become lower than the abnormality determination reference temperature Tw_thre.

If the cooling water temperature Tw has become lower than the abnormality determination reference temperature Tw_thre (S22: Yes), the abnormality determination module 106 starts timer count, and determines whether a counter value has reached a preset reference time T0, in step S26. If the counter value has not reached the reference time T0 (S26: No), the abnormality determination module 106 determines whether the key switch of the vehicle has been turned off, in step S28. If the key switch of the vehicle is turned off (S28: Yes), the abnormality diagnosis device 100 ends the current routine. On the other hand, if the key switch of the vehicle is not turned off (S28: No), the abnormality determination module 106 repeats steps S26 and S28, until the counter value reaches the reference time T0.

On the other hand, if the counter value reaches the reference time T0 (S26: Yes), the abnormality determination module 106 determines that an abnormality has occurred in the thermostat 32, in step S30. In connection with this, the abnormality determination module 106 may output a warning display or a warning sound for informing a driver or the like of the abnormality of the thermostat 32. Further, the abnormality determination module 106 may shift the control mode of the engine to the fail-safe mode and reduce the output of the engine.

As described above, according to the abnormality diagnosis device 100 of the thermostat 32 according to the present implementation, the abnormality of the thermostat 32 is detected, when the engine starts, the cooling water temperature Tw reaches the first reference temperature Tw1 that is estimated as warm-up completion, and thereafter becomes lower than the abnormality determination reference temperature Tw_thre. In doing so, the control for preventing the decrease of the cooling water temperature Tw is started, when the cooling water temperature Tw reaches the first reference temperature Tw1 and thereafter becomes lower than the second reference temperature Tw2 that is lower than the first reference temperature Tw1 and is higher than the abnormality determination reference temperature Tw_thre. Thereby, when the thermostat 32 is normal, further decrease of the cooling water temperature Tw is prevented, and the cooling water temperature Tw does not become lower than the abnormality determination reference temperature Tw_thre. Thus, the abnormality of the thermostat 32 can be prevented from being detected due to non-existence of combustion heat simply, when the thermostat 32 is normal.

Also, the cooling water temperature adjustment module 104 prevents the decrease of the cooling water temperature Tw to a degree that the cooling water temperature Tw continuously decreases when the thermostat 32 is abnormal, and thereby the abnormality is detected properly by the abnormality determination module 106, when the abnormality occurs in the thermostat 32.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For example, in the above implementation, the thermostat that includes the wax element is used as the thermostat 32, but the present invention is not limited to this example. The thermostat 32 may be a flow channel switching mechanism that includes one or a plurality of control valves that are controlled by a control device on the basis of the cooling water temperature, so as to switch the flow channel of the cooling water.

The invention claimed is:

1. An abnormality diagnosis device of a thermostat that opens and closes a cooling water passage, according to a temperature of cooling water of an engine, and switches between availability and unavailability of flow of the cooling water to a heat release device, comprising:
    a temperature detection module that detects the temperature of the cooling water on a basis of a sensor signal of a cooling water temperature sensor;
    an abnormality determination module that detects an abnormality of the thermostat, when the temperature of the cooling water reaches a first reference temperature at which warm-up of the engine is completed and thereafter decreases from the first reference temperature to fall below an abnormality determination reference temperature that is lower than the first reference temperature; and
    a cooling water temperature adjustment module that prevents decrease of the temperature of the cooling water to the abnormality determination reference temperature before the temperature of the cooling water reaches the abnormality determination reference temperature, when the temperature of the cooling water first reaches the first reference temperature at which the warm-up of the engine is completed and thereafter decreases from the first reference temperature to fall below a second reference temperature, wherein
    the second reference temperature is set to start a control to prevent the decrease of the temperature of the cooling water, and
    the second reference temperature is lower than the first reference temperature and is higher than the abnormality determination reference temperature.

2. The abnormality diagnosis device of the thermostat according to claim 1, wherein
    the cooling water temperature adjustment module executes one or both of a control for reducing heat release of the cooling water and a control for increasing heat generation of the engine.

3. The abnormality diagnosis device of the thermostat according to claim 2, wherein
    when the temperature of the cooling water is lower than the second reference temperature in a fuel cut control state, the cooling water temperature adjustment module halts a fuel cut control.

4. The abnormality diagnosis device of the thermostat according to claim 3, wherein
    the cooling water temperature adjustment module executes small amount fuel injection.

5. The abnormality diagnosis device of the thermostat according to claim 3, wherein
    the cooling water temperature adjustment module decreases output of a heater device that utilizes a heat quantity of the cooling water.

6. The abnormality diagnosis device of the thermostat according to claim 3, wherein
the cooling water temperature adjustment module decreases a flow rate of the cooling water that passes through the engine.

7. The abnormality diagnosis device of the thermostat according to claim 2, wherein
when the temperature of the cooling water is lower than the second reference temperature and a traveling mode of a vehicle is an electric vehicle mode, the cooling water temperature adjustment module starts driving of the engine.

8. The abnormality diagnosis device of the thermostat according to claim 7, wherein
the cooling water temperature adjustment module executes small amount fuel injection.

9. The abnormality diagnosis device of the thermostat according to claim 2, wherein
the cooling water temperature adjustment module decreases output of a heater device that utilizes a heat quantity of the cooling water.

10. The abnormality diagnosis device of the thermostat according to claim 2, wherein
the cooling water temperature adjustment module decreases a flow rate of the cooling water that passes through the engine.

11. The abnormality diagnosis device of the thermostat according to claim 1, wherein
when the temperature of the cooling water is lower than the second reference temperature in a fuel cut control state, the cooling water temperature adjustment module halts a fuel cut control.

12. The abnormality diagnosis device of the thermostat according to claim 11, wherein
the cooling water temperature adjustment module executes small amount fuel injection.

13. The abnormality diagnosis device of the thermostat according to claim 11, wherein
the cooling water temperature adjustment module decreases output of a heater device that utilizes a heat quantity of the cooling water.

14. The abnormality diagnosis device of the thermostat according to claim 11, wherein
the cooling water temperature adjustment module decreases a flow rate of the cooling water that passes through the engine.

15. The abnormality diagnosis device of the thermostat according to claim 1, wherein
when the temperature of the cooling water is lower than the second reference temperature and a traveling mode of a vehicle is an electric vehicle mode, the cooling water temperature adjustment module starts driving of the engine.

16. The abnormality diagnosis device of the thermostat according to claim 15, wherein
the cooling water temperature adjustment module executes small amount fuel injection.

17. The abnormality diagnosis device of the thermostat according to claim 1, wherein
the cooling water temperature adjustment module decreases output of a heater device that utilizes a heat quantity of the cooling water.

18. The abnormality diagnosis device of the thermostat according to claim 1, wherein
the cooling water temperature adjustment module decreases a flow rate of the cooling water that passes through the engine.

19. An abnormality diagnosis device of a thermostat that opens and closes a cooling water passage, according to a temperature of cooling water of an engine, and switches between availability and unavailability of flow of the cooling water to a heat release device, comprising:
circuitry configured to
detect the temperature of the cooling water on a basis of a sensor signal of a cooling water temperature sensor,
detect an abnormality of the thermostat, when the temperature of the cooling water reaches a first reference temperature at which warm-up of the engine is completed and thereafter decreases from the first reference temperature to fall below an abnormality determination reference temperature that is lower than the first reference temperature, and
prevent decrease of the temperature of the cooling water to the abnormality determination reference temperature before the temperature of the cooling water reaches the abnormality determination reference temperature, when the temperature of the cooling water first reaches the first reference temperature at which the warm-up of the engine is completed and thereafter decreases from the first reference temperature to fall below a second reference temperature, wherein
the second reference temperature is set to start a control to prevent the decrease of the temperature of the cooling water, and
the second reference temperature is lower than the first reference temperature and is higher than the abnormality determination reference temperature.

20. An abnormality diagnosis device of a thermostat that opens and closes a cooling water passage, according to a temperature of cooling water of an engine, and switches between availability and unavailability of flow of the cooling water to a heat release device, comprising:
a temperature detection module that detects the temperature of the cooling water on a basis of a sensor signal of a cooling water temperature sensor;
an abnormality determination module that detects an abnormality of the thermostat, when the temperature of the cooling water reaches a first reference temperature at which warm-up of the engine is completed and thereafter decreases from the first reference temperature to fall below an abnormality determination reference temperature that is lower than the first reference temperature; and
a cooling water temperature adjustment module that halts a fuel cut control for preventing temperature decrease of the cooling water before the temperature of the cooling water reaches the abnormality determination reference temperature, when the temperature of the cooling water first reaches the first reference temperature at which the warm-up of the engine is completed and thereafter decreases from the first reference temperature to fall below a second reference temperature in a fuel cut control state of the engine,
wherein
the second reference temperature is set to start a control to prevent the decrease of the temperature of the cooling water, and
the second reference temperature is lower than the first reference temperature and higher than the abnormality determination reference temperature.

* * * * *